(12) United States Patent
Serkh et al.

(10) Patent No.: US 9,033,832 B1
(45) Date of Patent: May 19, 2015

(54) ISOLATING DECOUPLER

(71) Applicant: THE GATES CORPORATION, Denver, CO (US)

(72) Inventors: Alexander Serkh, Troy, MI (US); Robert Deady, Plymouth, MI (US); Dean Schneider, Washington, MI (US)

(73) Assignee: GATES CORPORATION, Denver, CO (US)

( * ) Notice: Subject to any disclaimer, the term of this patent is extended or adjusted under 35 U.S.C. 154(b) by 3 days.

(21) Appl. No.: 14/162,564

(22) Filed: Jan. 23, 2014

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16D 3/00* | (2006.01) |
| *F16H 55/14* | (2006.01) |
| *F16H 55/36* | (2006.01) |
| *F02B 67/06* | (2006.01) |

(52) U.S. Cl.
CPC ............... *F16H 55/36* (2013.01); *F02B 67/06* (2013.01); *F16H 2055/366* (2013.01)

(58) Field of Classification Search
CPC ....... F16D 41/206; F16D 7/022; F16H 55/36; F16H 2055/366; F02B 67/06
USPC ..................................... 474/70, 94
See application file for complete search history.

(56) References Cited

U.S. PATENT DOCUMENTS

| | | |
|---|---|---|
| 773,320 A | 10/1904 | Haase, Jr. |
| 2,396,985 A | 3/1946 | Burrus |
| 2,551,739 A | 5/1951 | Harlan |
| 2,633,953 A | 4/1953 | Gorske |
| 2,794,524 A | 6/1957 | Sacchini et al. |
| 2,829,748 A | 4/1958 | Sacchini et al. |
| 2,866,349 A | 12/1958 | Heckethom |
| 2,885,896 A | 5/1959 | Hungerford, Jr. et al. |
| 2,968,380 A | 1/1961 | Sacchini et al. |
| RE25,229 E | 8/1962 | Sacchini et al. |
| 3,059,493 A | 10/1962 | Wolfram |
| 3,242,696 A | 3/1966 | Kaplan |
| 3,249,190 A | 5/1966 | Botnick |

(Continued)

FOREIGN PATENT DOCUMENTS

| | | |
|---|---|---|
| EP | 095842 A1 | 12/1983 |
| EP | 1279807 A1 | 1/2003 |

(Continued)

OTHER PUBLICATIONS

Extended European Search Report dated Mar. 5, 2007, for EP application No. 07001751.2.

(Continued)

*Primary Examiner* — Henry Liu
(74) *Attorney, Agent, or Firm* — Jeffrey A. Thurnau, Esq.; Paul N. Dunlap, Esq.

(57) ABSTRACT

An isolating decoupler comprising a shaft, a pulley journalled to the shaft, a torsion spring engaged with the pulley, a wrap spring frictionally engageable with the shaft, the torsion spring and wrap spring connected in series such that each is torsionally loaded in a winding direction, the wrap spring comprising a variable cross-section having a first cross sectional dimension and a second cross sectional dimension, and the wrap spring temporarily releasable from the shaft in an overtorque condition by contact with the pulley urging the wrap spring in an unwinding direction.

11 Claims, 4 Drawing Sheets

(56) References Cited

U.S. PATENT DOCUMENTS

| | | | |
|---|---|---|---|
| 3,298,486 A | | 1/1967 | Perryman |
| 3,618,730 A | * | 11/1971 | Mould, III .................. 192/56.2 |
| 4,460,076 A | | 7/1984 | Yamada |
| 5,139,463 A | | 8/1992 | Bytzek et al. |
| 5,156,573 A | | 10/1992 | Bytzek et al. |
| 5,437,205 A | | 8/1995 | Tseng |
| 5,598,913 A | | 2/1997 | Monahan et al. |
| 5,879,254 A | | 3/1999 | Tanaka |
| 6,044,943 A | | 4/2000 | Bytzek et al. |
| 6,083,130 A | * | 7/2000 | Mevissen et al. .............. 474/70 |
| 6,119,841 A | | 9/2000 | Orlamunder |
| 6,394,247 B1 | | 5/2002 | Monahan et al. |
| 6,394,248 B1 | | 5/2002 | Monahan et al. |
| 6,637,570 B2 | | 10/2003 | Miller et al. |
| 6,676,548 B2 | | 1/2004 | Fujiwara |
| 6,691,846 B2 | | 2/2004 | Titus et al. |
| 6,761,656 B2 | | 7/2004 | King et al. |
| 7,052,420 B2 | | 5/2006 | King et al. |
| 7,070,033 B2 | * | 7/2006 | Jansen et al. ................. 192/41 S |
| 7,153,227 B2 | * | 12/2006 | Dell et al. ........................ 474/70 |
| 7,191,880 B2 | | 3/2007 | Liston et al. |
| 7,207,910 B2 | | 4/2007 | Dell et al. |
| 7,318,776 B2 | * | 1/2008 | Honda ............................ 464/40 |
| 7,591,357 B2 | | 9/2009 | Antchak et al. |
| 7,618,337 B2 | | 11/2009 | Jansen et al. |
| 8,132,657 B2 | * | 3/2012 | Antchak et al. ............... 192/55.1 |
| 8,302,753 B2 | * | 11/2012 | Antchan et al. ............... 192/55.5 |
| 8,534,438 B2 | * | 9/2013 | Antchak et al. ............... 192/55.5 |
| 8,678,157 B2 | * | 3/2014 | Ward et al. ................... 192/55.1 |
| 8,789,670 B2 | * | 7/2014 | Antchak et al. ............... 192/41 S |
| 8,813,928 B2 | * | 8/2014 | Schneider et al. ........... 192/41 S |
| 8,813,932 B2 | * | 8/2014 | Ward et al. ................... 192/55.5 |
| 8,820,503 B2 | * | 9/2014 | Schneider et al. ........... 192/55.5 |
| 8,888,619 B2 | * | 11/2014 | Antchak et al. ............... 474/74 |
| 8,931,610 B2 | * | 1/2015 | Serkh ........................... 192/55.5 |
| 2006/0144664 A1 | * | 7/2006 | Antchak et al. ............... 192/41 S |
| 2007/0240964 A1 | * | 10/2007 | Saito et al. .................... 192/41 S |
| 2008/0108442 A1 | * | 5/2008 | Jansen et al. .................... 464/54 |
| 2008/0194339 A1 | * | 8/2008 | Antchak et al. ............... 464/40 |
| 2009/0176583 A1 | * | 7/2009 | Dell et al. ....................... 464/40 |
| 2009/0176608 A1 | * | 7/2009 | Jansen et al. .................... 474/74 |
| 2011/0224038 A1 | * | 9/2011 | Aantchak et al. ............... 474/94 |
| 2012/0298474 A1 | * | 11/2012 | Ward et al. .................... 192/41 S |
| 2013/0092501 A1 | * | 4/2013 | Schneider et al. ........... 192/41 S |
| 2013/0217524 A1 | * | 8/2013 | Antchak et al. ............... 474/94 |
| 2013/0237351 A1 | * | 9/2013 | Marion .......................... 474/70 |
| 2014/0008175 A1 | * | 1/2014 | Schneider et al. ........... 192/41 S |

FOREIGN PATENT DOCUMENTS

| | | |
|---|---|---|
| EP | 1534972 B1 | 1/2008 |
| JP | 9144769 A | 6/1997 |
| JP | 10030450 A | 2/1998 |
| JP | 2002249794 A | 9/2002 |
| WO | 0192741 A1 | 12/2001 |
| WO | 0192746 A1 | 12/2001 |

OTHER PUBLICATIONS

Minutes from oral proceedings conducted at EPO on Jun. 21, 2007 in EP application No. 03 771 041.5.

European Patent Office, Communication pursuant to Article 96(2) EPC, dated May 5, 2006 in EP application No. 03 771 041.5.

European Patent Office, Commudcation pursuant to Article 96(2) EPC, dated Jun. 24, 2005 in EP application No. 03 771 041.5.

* cited by examiner

ISOLATING DECOUPLER

FIELD OF THE INVENTION

The invention relates to an isolating decoupler, and more particularly, to an isolating decoupler comprising a wrap spring, the wrap spring comprising a variable cross-section having a first cross sectional dimension and a second cross sectional dimension.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Pat. No. 7,153,227 which discloses a decoupler for an alternator pulley in a serpentine drive system has a resilient, helical spring member that couples the alternator pulley with a hub structure through a spring retaining member. A bushing is disposed between the spring retaining member and the hub structure to facilitate sliding engagement therebetween. An annular sleeve member is disposed between the spring member and the alternator pulley to facilitate sliding engagement therebetween. The spring member is connected at one end thereof to the hub structure and connected at an opposite end thereof to the spring retaining member. The resilient spring member transmits the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement.

What is needed is an isolating decoupler comprising a wrap spring, the wrap spring comprising a variable cross-section having a first cross sectional dimension and a second cross sectional dimension. The present invention meets this need.

SUMMARY OF THE INVENTION

The primary aspect of the invention is an isolating decoupler comprising a wrap spring, the wrap spring comprising a variable cross-section having a first cross sectional dimension and a second cross sectional dimension.

Other aspects of the invention will be pointed out or made obvious by the following description of the invention and the accompanying drawings.

The invention comprises an isolating decoupler comprising a shaft, a pulley journalled to the shaft, a torsion spring engaged with the pulley, a wrap spring frictionally engageable with the shaft, the torsion spring and wrap spring connected in series such that each is torsionally loaded in a winding direction, the wrap spring comprising a variable cross-section having a first cross sectional dimension and a second cross sectional dimension, and the wrap spring temporarily releasable from the shaft in an overtorque condition by contact with the pulley urging the wrap spring in an unwinding direction.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
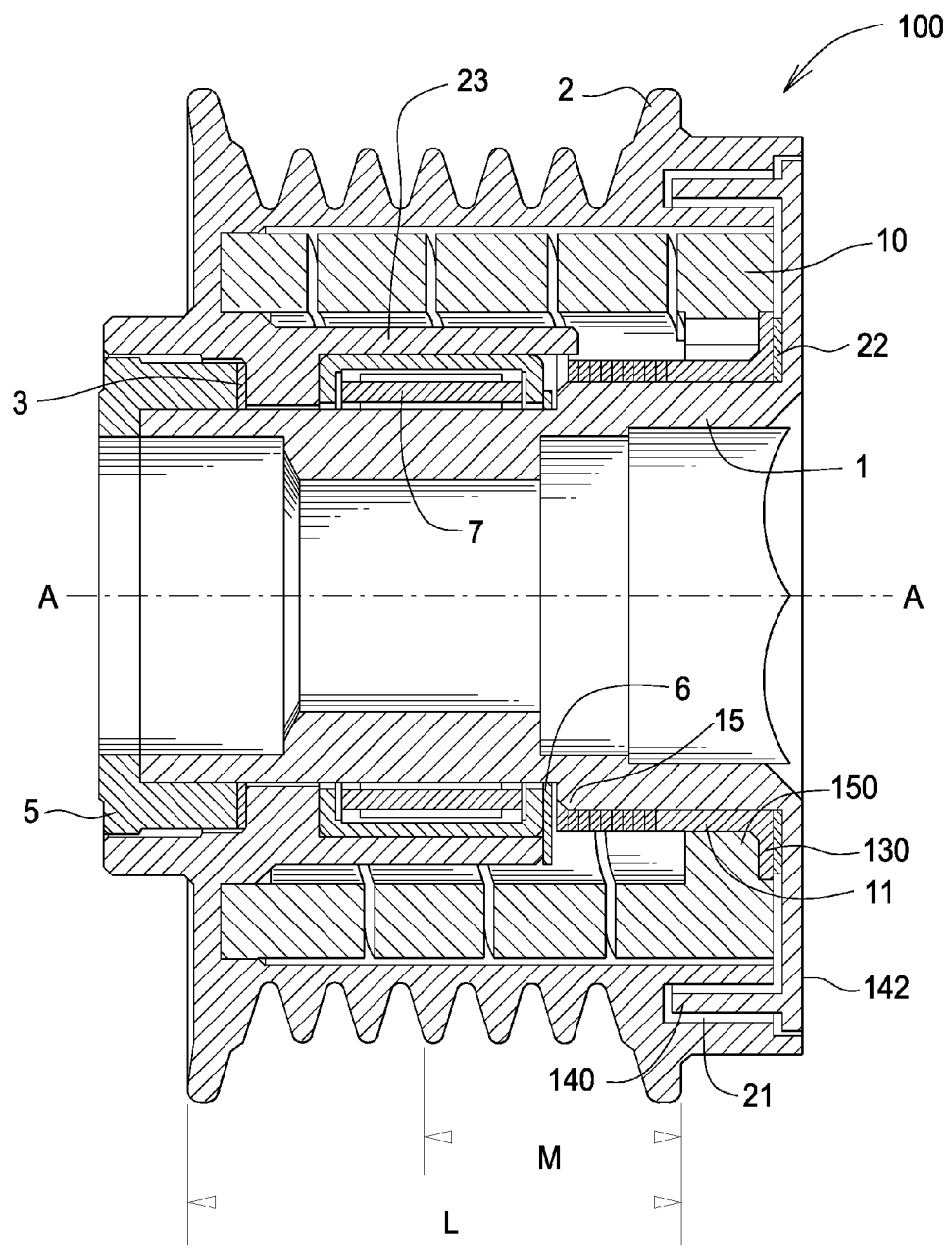
FIG. 1 is a cross-section view of the device.
Figure 2:
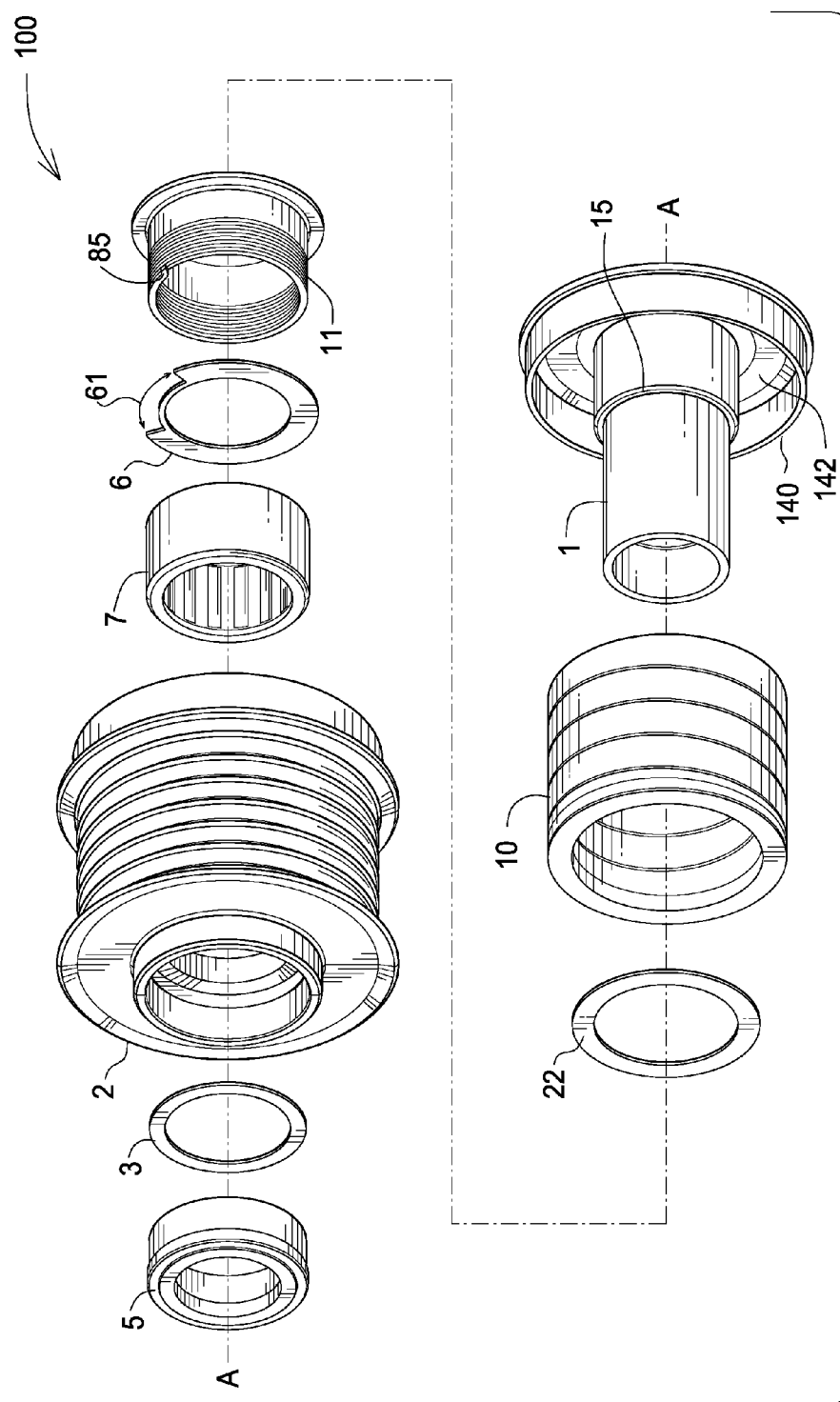
FIG. 2 is an exploded view of the device.

FIG. 1 is a cross-section view of the device. Alternator isolating decoupler 100 comprises a pulley 2, torsion spring 10, shaft 1, bearing 7, end cap 5, thrust washers 3, 6, and 22, and a wrap spring 11. FIG. 2 is an exploded view of the device.

Shaft 1 comprises a planar end portion 142 which extends radially from an axis of rotation A-A. Extending axially parallel to axis A-A from an outer part of portion 142 is cylindrical member 140. Member 140 engages a cooperating recess 21 in pulley 2, thereby forming a labyrinth seal. The labyrinth seal prevents debris from entering the device.

Pulley 2 is journalled to shaft 1 via a single needle bearing 7. Pulley 2 is axially located on shaft 1 between thrust washer 3 and thrust washer 6. Thrust washer 6 comprises a gap 61 which extends about a portion of the washer 6. Member 24 of pulley 2 extends through gap 61. Thrust washer 6 bears upon shoulder 15 of shaft 1. Thrust washer 3, pulley 2, bearing 7, and thrust washer 6 are held in place on shaft 1 by end cap 5. End cap 5 is press fit on shaft 1.

Pulley 2 comprises an inner cylindrical portion 23 which extends axially parallel to shaft 1 and pulley 2. Torsion spring 10 is disposed in part between pulley 2 and portion 23. Portion 23 provides a means by which pulley 2 engages bearing 7 without unduly extending the overall length of the device. Portion 23 allows bearing 7 to be disposed within the envelope of pulley 2 while also allowing room to accommodate torsion spring 10. Bearing 7 is located at a midportion "M" of the load bearing portion "L" of the pulley, which engages a multi-ribbed belt (not shown). Bearing 7 is the only means by which pulley 2 is journalled to shaft 1, which arrangement eliminates the need for two bearings, one at each end of the pulley. Shaft 1 and end cap 5 can be installed on an alternator shaft (not shown).

One end of torsion spring 10 is connected to pulley 2. The other end of torsion spring 10 is connected to wrap spring 11. Wrap spring 11 is frictionally engaged with shaft 1. Torsion spring 10 and wrap spring 11 are connected in series.

In operation, wrap spring 11 is wound about shaft 1. Wrap spring 11 is disposed radially inward of the torsion spring 10 with respect to axis A-A. When loaded in the winding direction the diameter of the wrap spring decreases, which causes wrap spring 11 to frictionally grip shaft 1. During a torque reversal shaft 1 will slightly overrotate with respect to pulley 2 given the inertia of a connected load such as an alternator. Given the frictional engagement between the wrap spring 11 and shaft 1, wrap spring 11 will slightly unwind thereby increasing its diameter, which causes wrap spring 11 to partially or fully release the frictional grip on shaft 1. This will allow shaft 1 to continue to over-rotate as pulley 2 slows. In this way wrap spring 11 operates in a manner similar to a one-way clutch.

For a typical alternator a maximum torque is in the range of approximately 16 Nm to 20 Nm. This torque is delivered to shaft 1 from pulley 2 by torsion spring 10 through wrap spring 11 in the direction of rotation of pulley 2. Torsion spring 10 is loaded in the winding direction as torque is transmitted to shaft 1.

Figure 3:
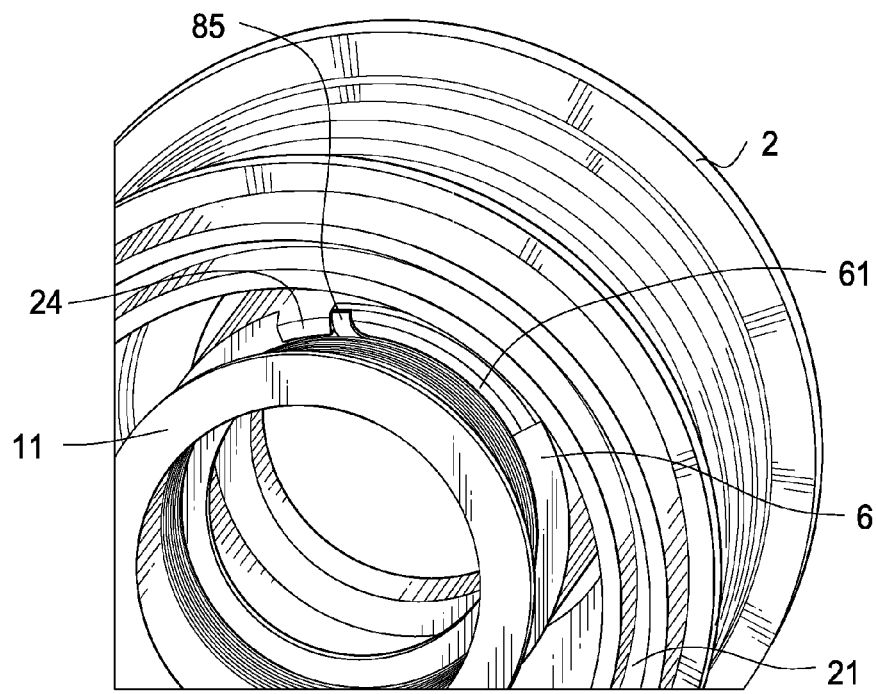
FIG. 3 is a perspective detail of the device.

FIG. 3 is a perspective detail of the device. Torsion spring 10 is omitted from this view. In an over-torque condition wrap spring 11 is also releasable from shaft 1. As torque increases pulley 2 will incrementally advance in relative relation to shaft 1. As pulley 2 continues to advance, member 24 of portion 23 will engage member 85 of wrap spring 11. Member 85 projects in a radially outward direction from the end of wrap spring 11. Member 24 extends axially from portion 23. In a normal torque condition member 24 does not engage member 85. As the transmitted torque increases member 24 will first contact and then press member 85 in an unwinding direction for wrap spring 11. This will in turn cause wrap spring 11 to partially unwind, thereby increasing the diameter of wrap spring 11. The increase in diameter will partially or fully release the frictional grip of wrap spring 11 from shaft 1, thereby allowing pulley 2 to over-rotate shaft 1 during the over-torque condition. This feature protects the device from damage during an over-torque condition.

Figure 4:
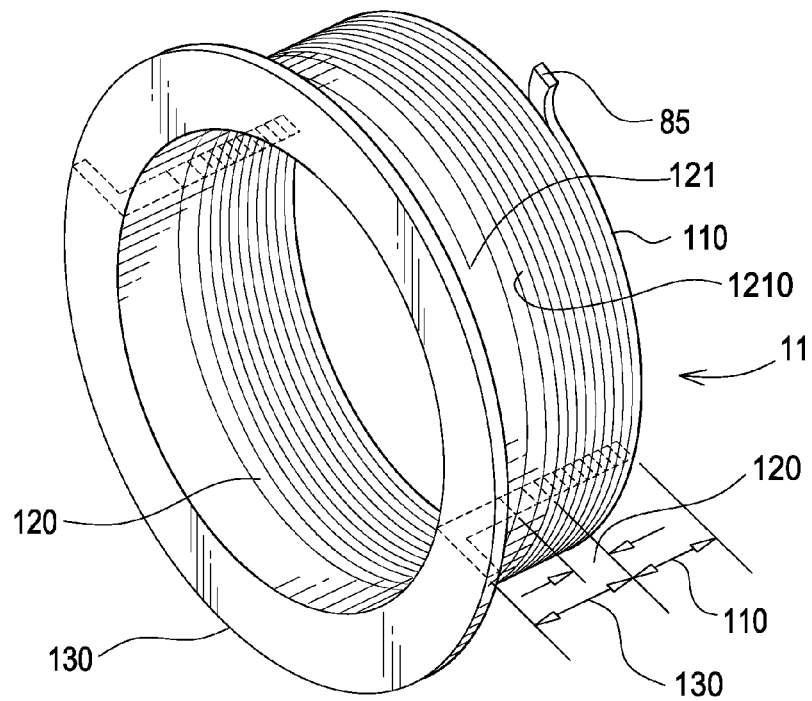
FIG. 4 is a perspective detail of the wrap spring.

FIG. 4 is a perspective detail of the wrap spring. Wrap spring 11 is a machined spring and is permanently connected to torsion spring 10. Torsion spring 10 is a machined spring as well. Wrap spring 11 has a variable cross-section along the length of its body. Wrap spring 11 comprises three portions: the constant cross-section portion 110, the variable cross-section portion 120, and the hub 130.

"Machined" refers to any manufacturing process performed on the spring in addition to winding, and can refer to cutting diagonal slots in a homogenous cylinder to form the spring, for example. It can also refer to machining the inner and outer surface of the cylinder to a preferred OD and ID dimension, or to machining each volute in the spring to vary a cross-sectional size and shape.

"Machined" can generally refer to adjusting or altering one or more physical characteristics of the spring in order to determine its operating characteristics.

Hub 130 of wrap spring 11 is attached to an end of torsion spring 10. In particular, hub 130 is press fit into an annular end 150 of torsion spring 10. Wrap spring 11 comprises two variable cross-section portions. Portion 120 has a cross-section of 2.4 mm×1.2 mm at its connection 121 to hub 130 and a second cross-section of 0.6 mm×1.2 mm at the connection 1210 with constant cross-section portion 110. Hub 130 does not comprise spring volutes or windings, although it is an integral part of the wrap spring 11. Member 85 extends from an end of portion 110.

All numeric dimensions contained herein are provided solely for the purpose of illustrating the invention and are not intended to limit the breadth or scope of the invention in any way.

At the connection 121 between hub 130 and variable cross-section portion 120 tension in the wrap spring will generate 16-20 Nm torque. At the connection 1210 between variable cross-section portion 120 and the constant cross-section portion 110 tension in the wrap spring generates torque that is approximately 6.5 to 10 times less than the maximum torque delivered by the torsion spring or 2-3 Nm. This is because friction between the variable cross-section portion 120 and shaft 1 will generate about 17 Nm to 18 Nm torque on shaft 1. The constant cross-section portion 110 accommodates this torque range. The cross-section of portion 110 is about 0.6 mm×1.2 mm. Wrap spring portion 110 has about 9 to 10 coils.

There is no, or a very small, ID interference between the variable cross-section portion 120 and shaft 1. Wrap spring portion 110 comprises an ID interference fit with shaft 1 sufficient to transmit approximately 2 to 3 Nm of torque to shaft 1. Once hub 130 is pulled by torsion spring 10 the variable cross-section portion 120 is pulled as well and so too portion 110.

Figure 5:
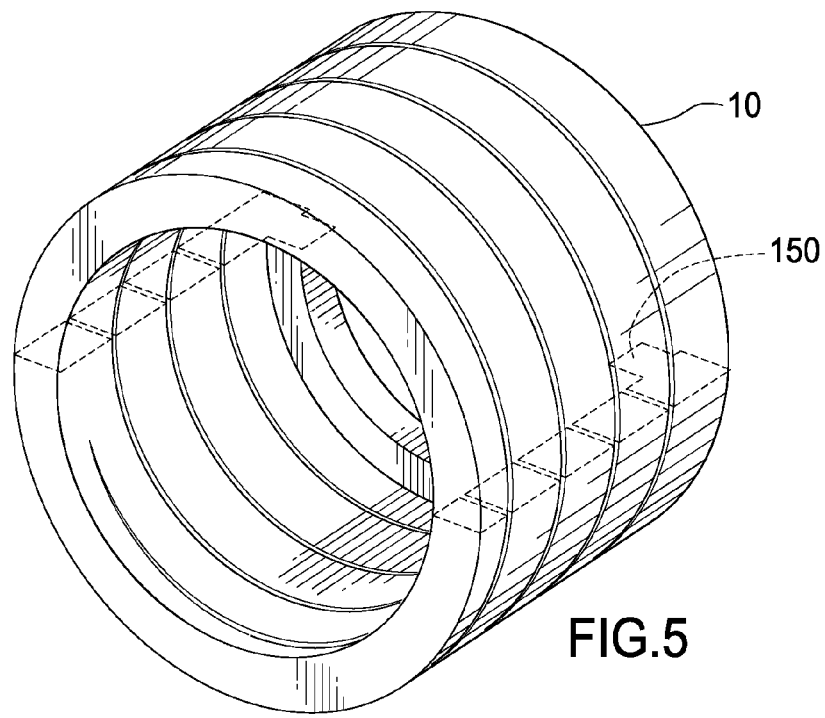
FIG. 5 is a perspective view of the torsion spring.
Figure 6:
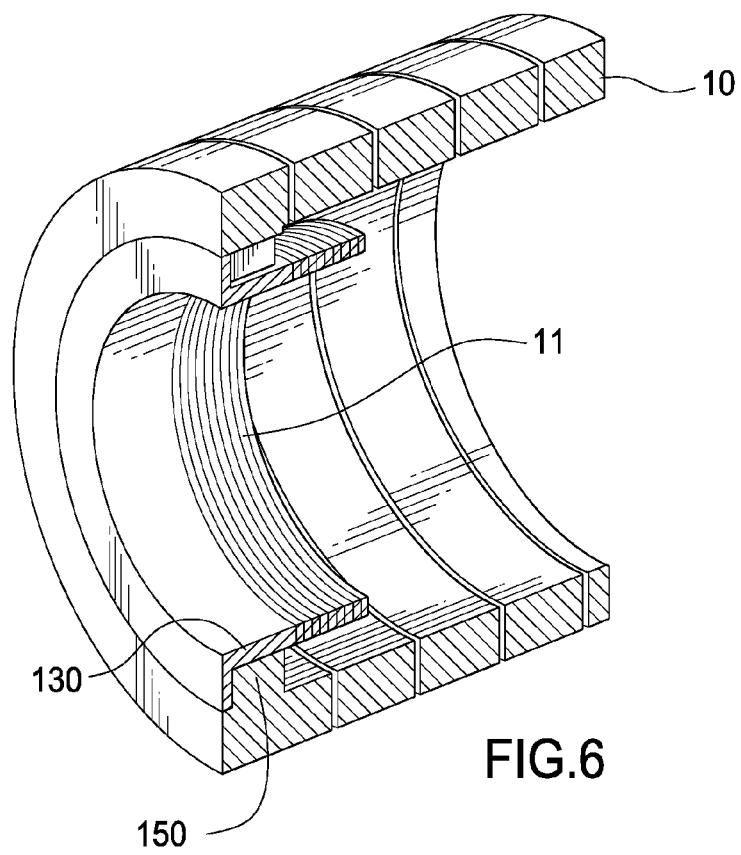
FIG. 6 is a cut away perspective view of FIG. 5.

FIG. 5 is a perspective view of the torsion spring. Torsion spring 10 comprises projecting member 150 which projects radially inward. Hub 130 of wrap spring 11 is press fit into projecting annular member 150, thereby connecting and axially locating wrap spring 11 within torsion spring 10. Unlike the prior art the instant device has no spring carrier disposed between the torsion spring and the wrap spring. FIG. 6 is a cut away perspective view of FIG. 5.

Advantages of the device include a smaller size one-way clutch (wrap spring 11) particularly in the axial direction, a smaller overall length due to the central location of bearing 7, a substantially smaller interference and friction torque requirement to lock the wrap spring, a substantially smaller drag torque during overrun, and a lower operating temperature due to lower friction between the wrap spring and the shaft.

Although a form of the invention has been described herein, it will be obvious to those skilled in the art that variations may be made in the construction and relation of parts without departing from the spirit and scope of the invention described herein.

We claim:

1. An isolating decoupler comprising:
   a shaft (1);
   a pulley (2) journalled to the shaft;
   a torsion spring (10) engaged with the pulley;
   a wrap spring (11) frictionally engageable with the shaft;
   the torsion spring and wrap spring connected in series such that each is torsionally loaded in a winding direction;
   the wrap spring comprising a variable cross-section (120) having a first cross sectional dimension and a second cross sectional dimension; and
   the wrap spring temporarily releasable from the shaft in an overtorque condition by contact with the pulley urging the wrap spring in an unwinding direction.

2. The isolating decoupler as in claim 1, wherein the wrap spring is disposed radially inward of the torsion spring.

3. The isolating decoupler as in claim 1, wherein the torsion spring comprises a radially inward projecting member for engaging the wrap spring.

4. The isolating decoupler as in claim 1, wherein the wrap spring comprises a member for temporarily engaging the pulley.

5. The isolating decoupler as in claim 1, wherein:
   the pulley comprises an inner cylindrical portion extending in an axial direction, the inner cylindrical portion engaging a bearing; and
   the torsion spring disposed radially outward of the inner cylindrical portion.

6. The isolating decoupler as in claim 5, wherein the bearing is disposed at a midpoint of a pulley load bearing portion.

7. An isolating decoupler comprising:
   a shaft;
   a pulley journalled to the shaft on a bearing disposed at a midpoint of the pulley load bearing portion;
   a torsion spring engaged with the pulley;

a wrap spring frictionally engageable with the shaft;

the torsion spring and wrap spring connected in series such that each is torsionally loaded in a winding direction;

the wrap spring comprising a variable cross-section having a first cross sectional dimension and a second cross sectional dimension; and the wrap spring temporarily releasable from the shaft in an overtorque condition by contact with the pulley urging the wrap spring in an unwinding direction.

8. An isolating decoupler comprising:

a shaft;

a pulley journalled to the shaft on a bearing disposed at a midpoint of a pulley load bearing portion;

a torsion spring engaged with the pulley;

a wrap spring disposed radially inward of the torsion spring, the wrap spring frictionally engageable with the shaft in a loaded condition;

the torsion spring and wrap spring connected in series such that each is torsionally loaded in a winding direction;

the wrap spring comprising a variable cross-section having a first cross sectional dimension and a second cross sectional dimension; and the wrap spring temporarily releasable from the shaft in an overtorque condition by contact with the pulley urging the wrap spring in an unwinding direction.

9. The isolating decoupler as in claim 8, wherein:

the pulley comprises an inner cylindrical portion extending in an axial direction, the inner cylindrical portion engaging the bearing; and the torsion spring disposed radially outward of the inner cylindrical portion.

10. The isolating decoupler as in claim 8, wherein the torsion spring comprises a radially inward projecting annular member for engaging the wrap spring.

11. The isolating decoupler as in claim 8, wherein the wrap spring comprises a member for temporarily engaging the pulley in the overtorque condition.

* * * * *